No. 747,549. PATENTED DEC. 22, 1903.
W. R. HARTIGAN.
EGG OPENER.
APPLICATION FILED APR. 10, 1902.
NO MODEL.
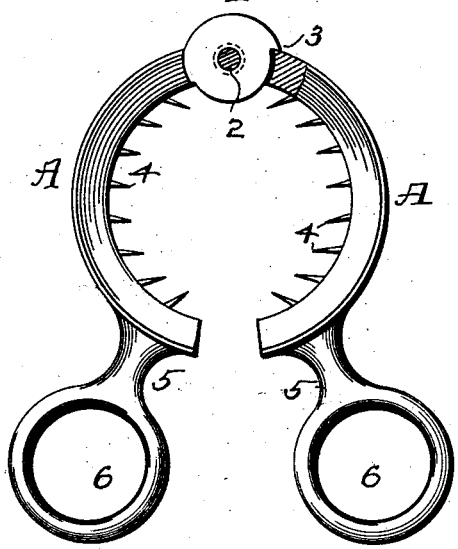
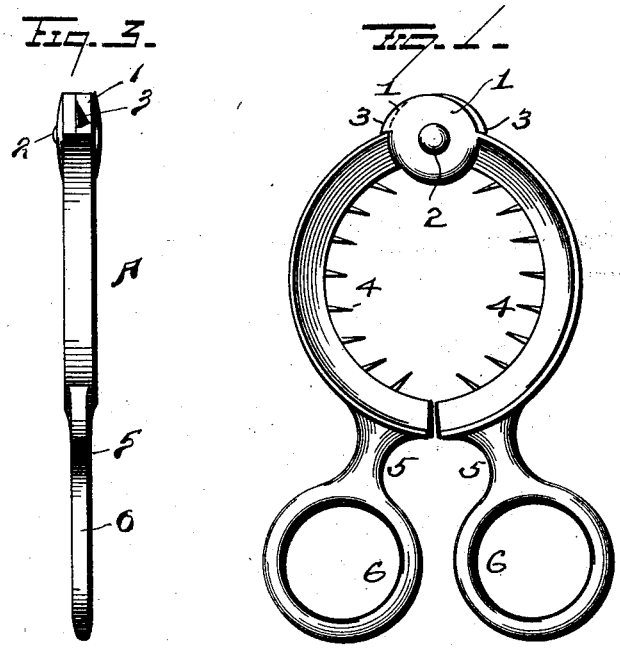
WITNESSES
E. J. Nottingham
G. F. Downing
INVENTOR
W. R. Hartigan
By H. A. Seymour
Attorney No. 747,549. Patented December 22, 1903.

UNITED STATES PATENT OFFICE.

WILLIAM R. HARTIGAN, OF COLLINSVILLE, CONNECTICUT.

EGG-OPENER.

SPECIFICATION forming part of Letters Patent No. 747,549, dated December 22, 1903.

Application filed April 10, 1902. Serial No. 102,265. (No model.)

*To all whom it may concern:*

Be it known that I, WILLIAM R. HARTIGAN, a resident of Collinsville, in the county of Hartford and State of Connecticut, have invented certain new and useful Improvements in Egg-Openers; and I do hereby declare the following to be a full, clear, and exact description of the invention, such as will enable others skilled in the art to which it appertains to make and use the same.

My invention relates to an improved egg-opener, the object of the invention being to provide a device of the above-mentioned character which will effectually remove a portion of the shell of an egg without crushing either the removed or remaining portion of the shell.

A further object is to simplify and improve the device described and claimed in Patent No. 355,316, granted to me January 4, 1887.

With these objects in view the invention consists in certain novel features of construction and combinations and arrangements of parts, as will be more fully hereinafter described, and pointed out in the claims.

Figure 1 is a view in side elevation of my improvement, showing the jaws closed. Fig. 2 is a similar view showing the jaws open for receiving the end of an egg. Fig. 3 is an edge view.

A A represent two segmental jaws, provided at one end with bearing-disks or enlargements 1, made with central alined holes in which a rivet or pin 2 is secured to pivotally connect the jaws, and the bearing-disks or enlargements 1 are each provided with a shoulder 3, against which the jaws strike to limit their hinged movement and prevent the insertion of the jaws too far on the egg, which would remove a greater portion of the shell than desirable.

The jaws A are provided on their inner edge with a series of radially-disposed teeth 4 to puncture the egg-shell, and are provided on their outer edge near their free ends with outwardly-projecting arms 5, terminating at their free ends in rings or loops 6, forming finger-holds to facilitate the opening and closing of the jaws.

It will be observed that the jaws are so shaped that when closed they form an elliptical opening between them and that all the teeth 4 on each jaw are arranged nearly parallel to each other, the teeth in the upper portion of the jaws inclining downwardly slightly, while those in the lower portion incline upward very slightly. By this form of jaws and arrangement of teeth all of the latter are caused to penetrate the shell to at about the same depth and cause that portion of the shell clasped by the jaws to be neatly severed from the remaining portion of the shell without breaking or rupturing the latter.

Various slight changes might be resorted to in the general form and arrangement of the several parts described without departing from the spirit and scope of my invention, and hence I would have it understood that I do not limit myself to the precise details set forth, but consider myself at liberty to make such slight changes and alterations as fairly fall within the spirit and scope of my invention.

Having fully described my invention, what I claim as new, and desire to secure by Letters Patent, is—

1. An egg-opener, comprising two hinged jaws constructed to form an ellipse when closed, each jaw being provided with a series of teeth arranged nearly parallel to each other, substantially as set forth.

2. An egg-opener comprising two hinged jaws constructed to form an ellipse when closed, means for limiting the outward movement of the jaws; handles having rings or loops, said jaws each being provided with a series of teeth which are arranged nearly parallel to each other, substantially as set forth.

In testimony whereof I have signed this specification in the presence of two subscribing witnesses.

WILLIAM R. HARTIGAN.

Witnesses:
M. J. MCFARLAND,
J. H. BIDWELL.